United States Patent Office 2,913,463
Patented Nov. 17, 1959

2,913,463
CERTAIN 1,3-SUBSTITUTED THIOPARABANIC ACIDS

Renat Herbert Mizzoni, Chester, N.J., assignor to Ciba Pharmaceutical Products, Inc., Summit, N.J., a corporation of New Jersey No Drawing. Application January 9, 1958
Serial No. 707,864

10 Claims. (Cl. 260—309.5)

This invention relates to a new series of 2-thioparabanic acid derivatives. More particularly, it concerns 1-$R_1$-3-$R_2$-2-thioparabanic acids, in which $R_1$ and $R_2$ stand for substituted phenyl radicals with the proviso that at least one of the phenyl radicals is substituted with an ether group, as well as process for the preparation of such compounds. Ether groups substituting the phenyl radicals are especially lower hydrocarbonoxy groups, in which the lower hydrocarbon radical contains from 1 to 8 carbon atoms and is represented by lower aliphatic hydrocarbon groups, such as lower alkyl groups, e.g. methyl, ethyl, propyl, isopropyl, butyl, isobutyl, secondary butyl, tertiary butyl, pentyl, isopentyl, secondary pentyl, neopentyl, hexyl, or octyl; or lower alkenyl groups, e.g. allyl or α- or β-methylallyl. Such lower hydrocarbonoxy groups are unsubstituted or may contain, in addition, functional groups. Tertriary amino groups may be mentioned as such functional groups, which may form together with the lower hydrocarbonoxy radicals tertiary amino-lower hydrocarbonoxy radicals. Such tertiary amino groups are more particularly N,N-di-lower alkyl-amino groups, e.g. dimethylamino, diethylamino or dipropyl-amino groups; or N,N-lower alkylene-imino, N,N-lower oxa-alkyleneimino groups or N,N-lower aza-alkylene-imino groups, such as pyrrolidino; piperidino e.g. piperidino or 3-methyl-piperidino; morpholino or piperazino e.g. 4-methyl-piperazino groups. The tertiary amino groups are preferably attached to lower alkoxy radicals in which the lower alkyl radical contains from 2 to 3 carbon atoms, in which the tertiary amino groups are separated from the oxy group by at least 2 carbon atoms; such tertiary amino-lower alkoxy radicals are, for example, 2-ethoxy, 2-propoxy or 3-propoxy radicals. The 2-dimethylamino-ethoxy and 2-diethylamino-ethoxy radicals represent the tertiary amino-lower hydrocarbonoxy radicals, in which the hydrocarbon radical contains more than 1 carbon atom. Furthermore, the lower hydrocarbonoxy radicals may be substituted by hydroxyl groups, especially etherified hydroxyl groups, such as lower alkoxy, e.g. methoxy or ethoxy, which groups are preferably separated from the oxy group by at least 2 carbon atoms. Together with the lower hydrocarbonoxy radicals such etherified hydroxyl groups form, for example, lower oxaalkyloxy, e.g. 3-oxapentyloxy, radicals.

At the most, one of the ether groupings, substituting the phenyl radicals $R_1$ and $R_2$, may be replaced by another substituent; such a replacing substituent may be a lower alkoyl group e.g. acetyl group; a lower alkoyloxy group e.g. acetoxy; a tertiary amino group, e.g. dimethylamino or diethylamino; or a halogen atom e.g. chlorine, etc.

Those 1-$R_1$-3-$R_2$-2-thioparabanic acids, in which $R_1$ and/or $R_2$ contain salt forming substituents, such as, for example, tertiary amino or tertiary amino-lower alkoxy groups, may form salts, particularly therapeutically useful acid addition salts, such as those with inorganic acids, for example, hydrohalic acids, e.g. hydrochloric or hydrobromic acid; thiocyanic acid; sulfuric or phosphoric acids; or those with organic acids, such as acetic, propionic, glycolic, lactic, maleic, fumaric, malic, tartaric, citric, salicyclic, 4-amino-salicylic, 2-phenoxybenzoic or 2-acetoxybenzoic acid and the like.

It has been found that the new compounds and salts of this invention inhibit the growth of different types of mycobacteria, such as Mycobacterium tuberculosis or Mycobacterium leprae and can therefore be used as tuberculostatic and leprostatic agents. Especially valuable as tuberculostatic agents, particularly against the human pathogenic strain H 37 Rv of Mycobacterium tuberculosis, are the 1,3-bis-(lower alkoxyphenyl)-2-thioparabanic acids, in which the lower alkoxy groups contain 4 or 5 carbon atoms and are preferably located in the 4-position of the phenyl radical. Representative of this group is the 2-thioparabanic acid of the formula:

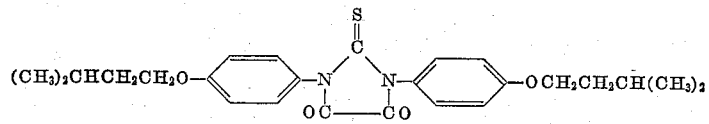

The following compounds may also be listed as illustrating the series of new 2-thioparabanic acids of this invention: 1,3-bis-(4-n-butyloxy-phenyl)-2-thioparabanic acid, 1,3-bis-(4-isobutyloxy-phenyl)-2-thioparabanic acid, 1,3-bis-(4-n-pentyloxyphenyl)-2-thioparabanic acid or 1-(4-ethoxy-phenyl)-3-(4-isobutyloxyphenyl)-2-thioparabanic acid. 1,3-diphenyl-2-thioparabanic acids, in which the phenyl radicals contain different substituents may be, for example, 1-(4-dimethylamino-phenyl)-3-(4-n-butyloxyphenyl)-2-thioparabanic acid or 1-(4-(2-diethylaminoethyl)-oxy-phenyl)-3-(4-isobutyloxy-phenyl)-2-thioparabanic acid.

The new compounds may be used as tuberculostatic or leprostatic agents in the form of pharmaceutical preparations, which contain the new compounds or salts thereof in admixture with a pharmaceutical organic or inorganic, solid or liquid carrier suitable for enteral or parenteral administration. For making up the preparations there can be employed susbtances which do not react with the new compounds, such as water, gelatine, lactose, starches, magnesium stearate, talc, vegetable oils, benzyl alcohols, gums, polyalkylene glycols, petroleum jelly or any other known carrier for medicaments. The pharmaceutical preparations may be in solid form, for example, as tablets, dragees or capsules or in liquid form, for example, as solutions or emulsions. If desired, they may contain auxiliary substances, such as preserving agents, stabilizing agents, wetting, or emulsifying agents, salts for varying the osmotic pressure or buffers. They may also contain, in combination, other therapeutically useful substances, primarily other antitubercular agents, such as, for example, p-aminosalicylic acid, isonicotinic acid hydrazide or streptomycin, or antileprotic agents, for example, sulfones, e.g. thiazolsulfone. The amounts per dosage unit of the new antitubercular and antileprotic compounds depends on the condition of the individual case to be treated.

Several methods may be employed for the preparation of the new 2-thioparabanic acids of this invention. I prefer to prepare the new compounds by treating a 1-$R_1$-3-$R_2$-2-thiourea, in which $R_1$ and $R_2$ have the above given meaning, with oxalic acid, preferably in the form of a reactive functional derivative thereof. Functional derivatives of oxalic acid, which are capable of reacting with a 2-thiourea to form the desired parabanic acids, are especially oxalyl halides, primarily oxalyl chloride. These reagents are preferably used in the presence of a non-hydroxylated solvent, such as, hydrocarbons, e.g. hexane, benzene or toluene; ethers, e.g. dioxane or 1,2-dimethoxy-ethane; or halogenated hydrocarbons, e.g. methylene chloride, chloroform, carbon tetrachloride or ethylene chloride. Another functional derivative of oxalic acid to be used in the above reaction is cyanogen. A solution, preferably an alcohol, e.g. methanol, ethanol or propanol, solution of the 2-thiourea derivative is treated with the gaseous cyanogen and the resulting reaction product is then hydrolyzed, preferably with an aqueous inorganic acid, e.g. hydrochloric, hydrobromic or sulfuric acid, to form the desired 2-thioparabanic acid.

The 1-$R_1$-3-$R_2$-2-thioureas used as the starting materials are known or may be prepared according to methods used for the preparation of known thioureas, for example, as described by C. F. Huebner et al., J. Am. Chem. Soc., vol. 75, p. 2274 (1953), and consists generally in treating carbon disulfide with an appropriately substituted arylamine in the presence of a catalytic amount of an alkali metal salt of an alkyl xanthate, such as potassium ethyl xanthate, or, particularly for the preparation of asymmetrically substituted 2-thioureas, in reacting a substituted arylisothiocyanate with a substituted arylamine. These thioureas may also be used in the form of their acid addition salts, if $R_1$ and/or $R_2$ contain a salt forming substituent, for example, a tertiary amino group e.g. a dimethylamino or a 2-diethylamino-ethoxy group.

A further method for the manufacture of the 2-thioparabanic acids of this invention consists in oxidizing a 2-$R_1$-imino-3-$R_2$-5-$R_3$-thiazolidine-4-one, in which $R_1$ and $R_2$ have the above given meaning and $R_3$ represents hydrogen or a methylene radical, or a salt thereof to the desired 1-$R_1$-3-$R_2$-2-thioparabanic acid.

Salts of the 2-$R_1$-imino-3-$R_2$-5-$R_3$-thiazolidine-4-ones, used as the starting material, are particularly those with inorganic acids, such as hydrohalic acids, e.g. hydrochloric or hydrobromic acid; or sulfuric acid, or with organic acids, such as acetic or propionic acid. Such salts may also be formed in the course of the reaction, for example, the 2-$R_1$-imino-3-$R_2$-5-$R_3$-thiazolidine-4-ones may be dissolved in an acidic medium, e.g. acetic acid, thus form a salt, e.g. the acetate, and then be oxidized. The thiazolidine-4-ones used as the starting materials may contain no substituent in the 5-position or may be substituted by a methylene radical, the latter being split off during oxidation with the formation of the oxo-group. Such methylene radicals are preferentially substituted by a lower alkyl radical, e.g. methyl; a monocyclic aryl radical, e.g. phenyl, or a monocyclic heterocyclic radial, e.g. 3-pyridyl.

The oxidation may be carried out with inorganic oxidation reagents, especially those containing hexavalent chromium, e.g. chromium trioxide or sodium bichromate, or selenium dioxide. The yield of the oxidation may be enhanced by adding buffers to reduce the acidity of the solution; especially suitable are metal salts, e.g. alkali metal salts, for example, those with organic acids, e.g., sodium, potassium or cerium acetate, or with inorganic acids, e.g. cerium sulfate, sodium sulfate or potassium or sodium phosphates.

The reaction is performed in the presence of a solvent; particularly suited are aqueous organic acids, e.g. aqueous acetic acid, especially when chromium trioxide or selenium dioxide are used as the oxidation agents; ketones such as acetone; or aqueous organic solvents, e.g. aqueous dioxane, particularly when sodium bichromate is used. The reaction may be carried out at room temperature; however, an elevated temperature, ranging from 40–150°, depending on the oxidation reagent used, is preferred.

The oxidation of the 2-$R_1$-imino-3-$R_2$-5-$R_3$-thiazolidine-4-ones, in which $R_1$, $R_2$ and $R_3$ have the above given meaning, does not result in the expected 2-$R_1$-imino-3-$R_2$-thiazolidine-4,5-diones; under the oxidative conditions a ring opening and a rearrangement with the formation of the 1-$R_1$-3-$R_2$-2-thioparabanic acids occur.

The 2-$R_1$-imino-3-$R_2$-5-$R_3$-thiazolidine-4-ones used as the starting materials may be prepared, for example, by reacting 1-$R_1$-3-$R_2$-2-thioureas, in which $R_1$ and $R_2$ have the above-given meanings, with α-halogenated-acetic acids, preferably in the presence of an alkali metal acetate e.g. sodium acetate. For example, the 2-(4-isopentyloxy - phenyl)-imino-3-(4-isopentyloxyphenyl)-thiazolidine-4- may be prepared by reacting the 1,3-bis-(4-isopentyloxy-phenyl)-2-thiourea with chloroacetic acid in the presence of sodium acetate, preferably in an ethanolic solution. A methylene group may be introduced into the 5-position, for example, by reacting a thiazolidine-4-one with an aldehyde, e.g. acetaldehyde, benzaldehyde or pyridine-3-aldehyde, preferably in an alcohol, e.g. ethanol, solution.

Depending on the reaction conditions and media used, the 1-$R_1$-3-$R_2$-2-thioparabanic acids, in which $R_1$ and/or $R_2$ contain salt forming substituents, such as tertiary amino or tertiary amino-lower alkoxy groups, may be obtained in the form of the free bases or salts thereof. The salts may be converted into the free bases in the customary way, e.g. by reaction with an alkali metal hydroxide, such as sodium or potassium hydroxide, or with aqueous ammonia. The free bases may be transformed into their therapeutically useful acid addition salts by reaction with appropriate inorganic or organic acids, such as those outlined above, for example, in an alcohol solution, e.g. methanol or ethanol, or an ether solution or in a mixture of such solvents. Recrystallization of a reaction product may also result in the formation of a hydrate e.g. hemihydrate, monohydrate, sesquihydrate or polyhydrate.

This application is a continuation-in-part application of my application, Serial No. 672,134, filed July 16, 1957, now abandoned.

The following examples are intended to illustrate the invention. They are not to be construed as being limitations thereon. Temperatures are given in degrees centigrade.

*Example 1*

A solution of 110 g. of 2-(4-isopentyloxy-phenyl)-imino-3-(4-isopentyloxy-phenyl)-thiazolidine - 4 - one and 175 g. of anhydrous sodium acetate in 2000 ml. of glacial acetic acid is heated to 85° on the steam bath. To this mixture is added over a period of one-quarter hour a solution of 125 g. of chromium trioxide in 100 ml. of water and 150 ml. of acetic acid while stirring. The mixture is cooled and then poured into cold water. The precipitate is filtered off, washed with a large quantity of water, and then air-dried. A solution of this material in hot benzene is distilled to remove the last traces of water together with some of the benzene, and the remaining benzene solution is treated with about 10 g. of Florex (diatomaceous earth), the adsorbent is then filtered off. A total amount of 67 g. of the yellow, fibrous 1,3-bis-(4-isopentyloxy-phenyl)-2-thioparabanic acid is obtained, melting at 185.5–186°.

The starting material used in the above reaction may be prepared as follows: A mixture of 160 g. of 1,3-bis-(4-isopentyloxyphenyl)-2-thiourea, 58 g. of chloroacetic acid and 110 g. of anhydrous sodium acetate is suspended in 1500 ml. of anhydrous alcohol and refluxed for 11 hours. The solution is filtered hot and allowed to crystallize in the cold. The solid is filtered off, washed with isopropanol and dried over sodium sulfate. An additional crop is obtained by concentrating the filtrate which is then diluted with petroleum ether. The combined solids are recrystallized from hot cyclohexane, whereupon the 2-(4-isopentyloxy-phenyl)-imino-3-(4-isopentyloxy-phenyl)-thiazolidine-4-one melts at 132–133°.

Example 2

A mixture of 4.4 g. of 2-(4-isopentyloxy-phenyl)-imino-3-(4-isopentyloxy-phenyl)-thiazolidine-4-one and 1.16 g. of selenium dioxide in 35 ml. of acetic acid is refluxed for one hour with precipitation of selenium. The solution is filtered, poured into water, and the orange-colored solid is filtered off. After washing with water, the 1,3-bis-(4-isopentyloxy-phenyl)-2-thioparabanic acid is recrystallized once from isopropanol and twice from benzene (yield: 2.5 g.) and is identical with the product obtained according to the procedure described in Example 1.

Example 3

A solution of 8.5 g. of 2-(4-isopentyloxy-phenyl)-imino-3-(4-isopentyloxy-phenyl)-5-(3-pyridyl-methylene)-thiazolidine-4-one and 8.8 g. anhydrous sodium acetate in 115 ml. of acetic acid is heated on the steam bath to about 80° and then treated in portions with a total of 7.1 g. of solid chromium trioxide over a period of ten minutes while stirring. The mixture is heated for an additional 20 minutes, then cooled and poured into water. The air-dried material obtained after filtering and washing with water is recrystallized several times from benzene. The resulting 1,3-bis-(4-isopentyloxy-phenyl)-2-thioparabanic acid does not give a melting point depression with the material obtained according to the procedure described in Examples 1 and 2.

The starting material used in the above reaction may be prepared as follows: A mixture of 15 g. of 2-(4-isopentyloxy-phenyl) - imino-3 - (4 - isopentyloxy-phenyl)-thiazolidine-4-one, 4.4 g. of pyridine-3-aldehyde and 13.6 g. of anhydrous sodium acetate in 34 ml. of acetic acid is refluxed for 3½ hours. After chilling, filtering, washing with water and air-drying, the 2-(4-isopentyloxy-phenyl)-imino-3-(4 - isopentyloxy-phenyl)-5-(3 - pyridyl-methylene)-thiazolidine-4-one is recrystallized once from propanol and once from a mixture of benzene and petroleum ether, M.P. 173–174°.

Example 4

A mixture of 10 g. of 2-(4-ethoxy-phenyl)-imino-3-(4-ethoxy-phenyl)-thiazolidine-4-one and 30 g. of sodium acetate in 200 ml. of acetic acid is heated to about 85° on a steam bath. To this solution is added over a period of 7 minutes a solution of 10 g. of chromium trioxide in 15 ml. of water and 35 ml. of acetic acid while stirring. After an additional period of one-quarter hour of heating, the mixture is chilled and poured into a large amount of water and then filtered. The product is washed with water and then air-dried on the filter. After repeated recrystallization from about 250 ml. portions of benzene, 5.6 g. of the 1,3-bis-(4-ethoxy-phenyl)-2-thioparabanic acid is obtained, M.P. 265–265.5°.

Example 5

A solution of 28 g. of 2-(4-n-pentyloxy-phenyl)-imino-3-(4-n-pentyloxy-phenyl)-thiazolidine-4-one and 44.6 g. of sodium acetate in 400 ml. of acetic acid is heated to 80–90° on the steam bath and over a period of 10 minutes a solution of 31.8 g. of chromium trioxide in 25 ml. of water and 38 ml. of acetic acid is added. Heating is continued for an additional 20 minutes, and, after cooling, the reaction mixture is diluted with 3000 ml. of water. The precipitate is filtered off, washed with hot cyclohexane and the 1,3-bis-(4-n-pentyloxy-phenyl)-2-thioparabanic acid is recrystallized three times from benzene, M.P. 180–182°; yield: 4.7 g.

The starting material used in the above reaction may be prepared by reacting a solution of 1,3-bis-(4-n-pentyloxy-phenyl)-2-thiourea and anhydrous sodium acetate in ethanol with chloroacetic acid according to the procedure described in Example 1; the 2-(4-n-pentyloxy-phenyl) - imino-3-(4-n-pentyloxy phenyl) - thiazolidine-4-one melts at 105°.

Example 6

A mixture of 40.4 g. of 2-(4-n-propyloxy-phenyl)-imino-3-(4-n-propyloxyphenyl)-thiazolidine-4-one and 63 g. of sodium acetate in 400 ml. of acetic acid is heated to 90° on the steam bath, oxidized with a solution of 52.2 g. of chromium trioxide in 35 ml. of water and 70 ml. of acetic acid and worked up according to the procedure given in Example 5; the 1,3-bis-(4-n-propyloxy-phenyl)-2-thioparabanic acid melts at 226–227°; yield: 18 g.

The starting material used in the above reaction may be prepared as follows: A mixture of 13.8 g. of 1,3-bis-(4-propyloxy-phenyl)-2-thiourea, 5.8 g. of chloroacetic acid and 11.0 g. of anhydrous sodium acetate is suspended in 150 ml. of anhydrous ethanol and refluxed for 3¼ hours. The reaction mixture is filtered hot and allowed to crystallize under refrigeration. The material thus obtained is dissolved in benzene at room temperature, and the unreacted thiourea is filtered off. After removal of the solvent the filtrate yields the 2-(4-propyloxy-phenyl)-imino-3-(4-propyloxy-phenyl)-thiazolidine-4-one, which is twice recrystallized from a mixture of benzene and petroleum ether, M.P. 96–98° C.

Example 7

A refluxing solution of 28.8 g. of 1,3-bis-(2-methoxy-phenyl)-2-thiourea in 150 ml. of anhydrous chloroform is treated with 14 g. of oxalylchloride in 10 ml. of chloroform while stirring. After 1 hour of refluxing the reaction mixture is chilled, diluted with ether and the product filtered off. The 1,3-bis-(2-methoxy-phenyl)-2-thioparabanic acid is recrystallized from a mixture of benzene and pentane, M.P. 198–200°, yield: 20.5 g.

Example 8

A solution of 41.6 g. of 1-(4-isobutyloxy-phenyl)-3-(4-(2-diethylaminoethyl)-oxy-phenyl)-2-thiourea hydrochloride in 200 ml. of chloroform is heated to reflux and 14 g. of oxalyl chloride in 50 ml. of chloroform is added over a period of five minutes while stirring. A precipitate is formed after one-quarter hour of refluxing and is then chilled. The solid material is filtered off, washed with ether and recrystallized from 95% ethanol to yield the sesquihydrate of 1-(4-isobutyloxyphenyl)-3-(4-(2-diethylaminoethyl) - oxy - phenyl)-2-thioparabanic acid hydrochloride melting at 146–148° (with decomposition); yield: 41.6 g.

Example 9

34.3 g. of 1-(4-n-butyloxy-phenyl)-3-(4-dimethylamino-phenyl)-2-thiourea is dissolved in 200 ml. of anhydrous chloroform. While refluxing and stirring a solution of 13.3 g. of oxalyl chloride in 50 ml. of anhydrous chloroform is added over a period of ten minutes and the reaction mixture is worked up as described in Example 7. The 1 - (4 - n-butyloxy-phenyl)-3-(4-dimethylamino-phenyl)-2-thioparabanic acid hydrochloride is recrystallized from a mixture of chloroform and methanol, M.P. 201–203°, yield: 10.6 g.

Example 10

Reaction of 22.6 g. of 1-(4-n-butyloxy-phenyl)-3-(4-(2-diethylaminoethyl)-oxy-phenyl) - 2 - thiourea hydrochloride in 350 ml. of hot chloroform with 7 g. of oxalyl chloride in 50 ml. of chloroform according to the procedure of Example 7 yields after recrystallization from ethanol 22.0 g. of the monohydrate of 1-(4-n-butyloxy-phenyl)-3-(4-(2-diethylaminoethyl)-oxy-phenyl)-2 - thioparabanic acid hydrochloride, M.P. 119–121° (with decomposition).

Example 11

Treatment of 34 g. of 1,3-bis-(4-allyloxy-phenyl)-2-thiourea with 14 g. of oxalyl chloride according to Example 7 yields 30.5 g. of the 1,3-bis-(4-allyloxy-phenyl)-

2-thioparabanic acid, which after recrystallization from benzene melts at 219.5–220°.

Example 12

The reaction of 34.4 g. of 1,3 - bis-(4-n-propyloxy-phenyl)-2-thiourea with 14 g. of oxalyl chloride is carried out according to the procedure given in Example 7; after recrystallization from benzene, the resulting 1,3-bis-(4-n-propyloxy-phenyl)-2-thioparabanic acid is identical with the product obtained according to the process described in Example 6.

Example 13

A mixture of 35.5 g. of 2-(4-isopropyloxy-phenyl)-imino-3-(4-isopropyloxy-phenyl)-thiazolidine-4-one and 54 g. of anhydrous sodium acetate in 450 ml. of acetic acid is oxidized with 45 g. of chromium trioxide in a mixture of 35 ml. of water and 55 ml. of acetic acid according to the process given in Example 1. The 1,3-bis-(4-isopropyloxy-phenyl)-2-thioparabanic acid is recrystallized from benzene and melts at 256–257°; yield: 18.5 g.

Example 14

The 1,3-bis-(4-isopropyloxy-phenyl) - 2 - thioparabanic acid, described in Example 14, is also obtained by reacting 17.3 g. of 1,3-bis-(4-isopropyloxy-phenyl)-2-thiourea with 6.4 g. of oxalyl chloride in a chloroform solution according to the procedure given in Example 7; yield: 17.0 g.

Example 15

A mixture of 42 g. of 2-(4-n-butyloxy-phenyl)-imino-3-(4-n-butyloxy-phenyl)-thiazolidine-4-one and 60 g. of sodium acetate in 500 ml. of glacial acetic acid is treated with a solution of 50 g. of chromium trioxide in 40 ml. of water and 60 ml. of acetic acid according to the procedure outlined in Example 1; the 1,3-bis-(4-n-butyloxy-phenyl)-2-thioparabanic acid melts at 194–194.5° after recrystallization from benzene; yield: 17.0 g.

Example 16

28.8 g. of 1,3-bis-(3-methoxy-phenyl)-2-thiourea is reacted with 14 g. of oxalyl chloride as described in Example 7; the resulting 1,3-bis-(3-methoxy-phenyl)-2-thioparabanic acid melts at 239–241°; yield: 29.0 g.

Example 17

22 g. of 1-(4-isopenthyloxy-phenyl)-3-(4-(2-diethylaminoethyl)-oxy-phenyl)-2-thiourea is reacted with 7.2 g. of oxalyl chloride as described in Example 7; the resulting 1-(4-isopentyloxy-phenyl)-3-(4-(2-dimethylaminoethyl)-oxy-phenyl)-2-thioparabanic acid hydrochloride melts at 173°; yield: 27.6 g.

Example 18

24.2 g. of 1-(4-methoxy-phenyl)-3-(4-ethoxy-phenyl)-2-thiourea is reacted with 11.2 g. of oxalyl chloride as described in Example 7. The resulting 1-(4-methoxy-phenyl-3-(4-ethoxy-phenyl)-2-thioparabanic acid melts at 220°; yield: 19.7 g.

Example 19

A mixture of 24.1 g. of 1-(4-ethoxy-phenyl)-3-4-isobutyloxy-phenyl)-2-thiourea and 9.8 g. of oxalyl chloride is reacted as described in Example 7; the 1-(4-ethoxy - phenyl)-3-(4-isobutyloxy-phenyl) - 2 - thioparabanic acid melts at 196°; yield: 20.0 g.

Example 20

A mixture of 30.7 g. of 1-(4-chloro-phenyl)-3-(4-ethoxy-phenyl)-2-thiourea and 14 g. of oxalyl chloride is reacted as described in Example 7; the resulting 1-(4-chloro-phenyl)-3-(4-ethoxy-phenyl)-2-thioparabanic acid melts at 212°; yield: 16.5 g.

Example 21

25.2 g. of 1-(4-ethoxy-phenyl)-3-(4-(3-oxapentyl)-oxyphenyl)-2-thiourea and 9.8 g. of oxalyl chloride are reacted according to Example 7; the 1-(4-ethoxy-phenyl)-3-(4-(3-oxapentyl)-oxy-phenyl) - 2 - thioparabanic acid melts at 165°; yield 20.7 g.

Example 22

A mixture of 26.4 g. of 1-(4-ethoxy-phenyl)-3-(4-acetoxy-phenyl)-2-thiourea and 11.2 g. of oxalyl chloride is reacted according to the procedure described in Example 7; the resulting 1 - (4 - ethoxy - phenyl) - 3 - (4-acetoxy-phenyl)-2-thioparabanic acid melts at 241°; yield: 20.7 g.

Example 23

25.1 g. of 1-(4 - ethoxy-phenyl) - 3 - (4-n-pentyloxy-phenyl)-2-thiourea and 9.8 g. of oxalyl chloride are reacted as described in Example 7; the resulting 1-(4-ethoxy-phenyl)-3-(4 - n - pentyloxy - phenyl) - 2 - thioparabanic acid melts at 167°; yield: 21.2 g.

Example 24

A mixture of 24.1 g. of 1-(4-ethoxy-phenyl)-3-(4-n-butyloxy-phenyl)-2-thiourea and 9.8 g. of axalyl chloride is reacted as described in Example 7; the 1-(4-ethoxy-phenyl)-3-(4 - n - butyloxy - phenyl) - 2 - thioparabanic acid melts at 187°; yield: 26.7 g.

Example 25

24.3 g. of 1,3-bis-(4-n-octyloxy-phenyl) - 2 - thiourea is reacted with 7 g. of oxalyl chloride according to the procedure given in Example 7; the resulting 1,3-bis-(4-n-octyloxy-phenyl)-2-thioparabanic acid melts at 152°; yield: 25.0 g.

Example 26

A mixture of 14.6 g. of 1,3-bis-(4-(3-oxapentyl)-oxy-phenyl)-2-thiourea and 7.4 g. of oxalyl chloride is reacted as described in Example 7; the 1,3-bis-(4-(3-oxapentyl)-oxyphenyl)-2-thioparabanic acid melts at 141°; yield: 7.4 g.

Example 27

26.4 g. of 1 - (4 - ethoxy - phenyl)-3-(4-proxyloxy-phenyl)-thiourea is reacted with 11.2 g. of oxalyl chloride according to the procedure given in Example 7 to yield 27.4 g. of 1-(4-ethoxy-phenyl)-3 - (4 - proxyloxy-phenyl)-2-thioparabanic acid, M.P. 233°.

Example 28

The 1,3 - bis - (4 - isobutyloxy - phenyl) - 2 - thioparabanic acid, M.P. 188°, is prepared by reacting 22.4 g. of 1,3-bis - (4 - isobutyloxy-phenyl)-2-thiourea with 8.4 g. of oxalyl chloride according to the procedure given in Example 7; yield: 24.4 g.

Example 29

An ethanol solution of 0.1 mole of 1,3-bis-(4-isopentyloxy-penyl)-2-thiourea is treated with gaseous cyanogen and addition of the gas stopped at the theoretical amount of uptake. The solvent is removed under reduced pressure, the residue dissolved in hot ethanol and treated with concentrated hydrochloric acid. The mixture is heated for twenty minutes, the solution chilled and the solid material filtered off. The air-dried 1,3-bis - (4 - isopentyloxy-phenyl)-2-thioparabanic acid melts at 184–186° after recrystallization from hot benzene.

Example 30

Treatment of 5.4 g. of 1-(3-trifluoromethyl-phenyl)-3-(4-isopentyloxyphenyl)-2-thiourea with 2.0 g. of oxalyl chloride according to the procedure outlined in Example 7 yields 2.5 g. of 1-(3-trifluoromethyl-phenyl)-3-(4-isopentyloxy-phenyl)-2-thioparabanic acid, M.P. 192.

Example 31

Treatment of 16.0 g. of 1,3-bis-(2-methoxy-5-chloro-phenyl)-2-thiourea with 5.8 g. of oxalyl chloride according to the procedure outlined in Example 7, yields 3.7 g. of 1,3-bis-(2-methoxy-5-chloro-phenyl)-2-thioparabanic acid, M.P. 197°.

Example 32

A mixture of 8.1 g. of 1-(4-acetyl-phenyl)-3-(4-isopentyloxy-phenyl)-2-thiourea and 3.2 g. of oxalyl chloride, when reacted accordingly to the procedure given in Example 7, yields 3.5 g. of 1-(4-acetyl-phenyl)-3-(4-isopentyloxy-phenyl)-2-thioparabanic acid, M.P. 149°.

Example 33

Upon treatment of equimolar amounts of 1,3-bis-(4-isopentyloxy-phenyl)-2-thiourea with oxalyl chloride according to the procedure described in Example 7 the 1,3-bis-(4-isopentyloxy-phenyl) - 2 - thioparabanic acid is formed, which is identical with the product obtained according to the procedure described in Example 1.

In addition to the two variations described hereinbefore the new thioparabanic derivatives may be prepared by introducing into the phenyl radicals of a 1,3-bis-phenyl-thioparabanic acid the desired substituents. For example, a phenolic hydroxyl group may be etherified by reacting a metal salt of the phenolic derivative, such as an alkali metal salt, e.g. a sodium salt, with a lower aliphatic hydrocarbon halide, e.g. chloride or bromide, or with a tertiary amino-lower alkyl halide, e.g. chloride or bromide. Phenolic hydroxyl groups may be acylated, e.g. acetylated, by reacting a metal salt thereof with an acid halide, e.g. acetyl chloride. A halogen atom may be introduced by diazotizing an amino group with nitrous acid and reacting the diazonium compound with a cuprous halide, e.g. cuprous chloride.

The invention also comprises any modification of the general process wherein a compound obtainable as an intermediate at any stage of the process is used as starting material and the remaining step(s) of the process is (are) carried out, as well as any new intermediates.

What is claimed is:

1. A member of the group consisting of 1-$R_1$-3-$R_2$-2-thioparabanic acids, in which $R_1$ and $R_2$ stand for phenyl radicals being mono-substituted by a member of the group consisting of lower alkoxy, lower alkenyloxy, di-lower alkyl-amino-lower alkoxy, lower oxa-alkoxy, lower alkoyl, lower alkoyloxy, di-lower alkyl-amino and halogen, with the proviso that at least one of the phenyl radicals $R_1$ and $R_2$ contains as a substituent a member of the group consisting of lower alkoxy, lower alkenyloxy, and lower oxa-alkoxy and therapeutically acceptable salts of those 1-$R_1$-3-$R_2$-2-thioparabanic acid derivatives, in which at least one of the phenyl radicals $R_1$ and $R_2$ contains as a substituent a member of the group consisting of di-lower alkyl-amino and di-lower alkyl-amino-lower alkoxy.

2. 1,3-bis-(4-lower alkoxyphenyl) - 2 - thioparabanic acid.

3. 1,3-bis-(4 - isopentyloxyphenyl) - 2 - thioparabanic acid.

4. 1,3-bis-(4 - butyloxy - phenyl) - 2 - thioparabanic acid.

5. 1,3-bis-(4 - isobutyloxy - phenyl) - 2 - thioparabanic acid.

6. 1-(4-ethoxy-phenyl) - 3 - (4 - isobutyloxy - phenyl)-2-thioparabanic acid.

7. 1-(4-di-lower alkyl-amino - lower alkoxy - phenyl)-3-(4-lower alkoxy-phenyl)-2-thioparabanic acid.

8. 1-(4-(2-diethylaminoethyl) - oxy - phenyl) - 3 - (4-isobutyloxy-phenyl)-2-thioparabanic acid.

9. 1-(4-(2-diethylaminoethyl)-oxy - phenyl) - 3 - (4-n-butyloxy-phenyl)-2-thioparabanic acid.

10. 1-(4-(2-diethylaminoethyl)-oxy-phenyl) - 3 - (4-isopentyloxy-phenyl)-2-thioparabanic acid.

References Cited in the file of this patent

Stieger, Chem. Abstracts, vol. 11, pages 1137–8 (1917).

De et al., Chem. Abstracts, vol. 22, p. 2552 (1928).

Dutt et al., Chem. Abstracts, vol 34, col. 5080 (1940).

UNITED STATES PATENT OFFICE
CERTIFICATE OF CORRECTION

Patent No. 2,913,463 November 17, 1959

Renat Herbert Mizzoni

It is hereby certified that error appears in the printed specification of the above numbered patent requiring correction and that the said Letters Patent should read as corrected below.

Column 2, line 9, for "salicyclic" read -- salicylic --; column 4, line 12, for "dine-4-" read -- dine-4-one --; column 5, line 17, after "8.8 g." insert -- of --; column 7, line 59, for "phenyl-3-" read -- phenyl)-3- --; column 8, line 60, for "tyloxy-penyl)-2-" read -- tyloxy-phenyl)-2- --; column 9, line 11, for "accordingly" read -- according --; column 10, line 11, for "oxa-alkoxy" read -- oxaalkoxy --.

Signed and sealed this 20th day of September 1960.

(SEAL)

Attest:

KARL H. AXLINE
Attesting Officer

ROBERT C. WATSON
Commissioner of Patents